April 14, 1931.　　　C. E. SANDSTROM　　　1,800,359

SIDE DOOR WINDSHIELD

Filed Sept. 30, 1929

INVENTOR,
Carl E. Sandstrom,
BY Minturn & Minturn
Attorneys.

Patented Apr. 14, 1931

1,800,359

UNITED STATES PATENT OFFICE

CARL E. SANDSTROM, OF INDIANAPOLIS, INDIANA, ASSIGNOR OF ONE-THIRD TO LOUIS C. WILSON AND ONE-THIRD TO WILLIAM S. WILSON, BOTH OF INDIANAPOLIS, INDIANA

SIDE-DOOR WINDSHIELD

Application filed September 30, 1929. Serial No. 396,325.

The object of this invention is to provide a wind-shield for the side-doors of automobiles, which can be made and sold as an attachment at a nominal price.

A further object is to provide a simple and secure removable attaching means which will hold the shield in a manner to prevent any rattling of parts.

The object, also, is to provide a transparent shield-body of celluloid to reduce the breakage to a minimum, and the object further is to reenforce the celluloid with metal in a manner to make it sufficiently rigid and to further increase its durability.

I accomplish the above, and other objects which will hereinafter appear, by the means illustrated in the accompanying drawing, in which—

Figure 2:
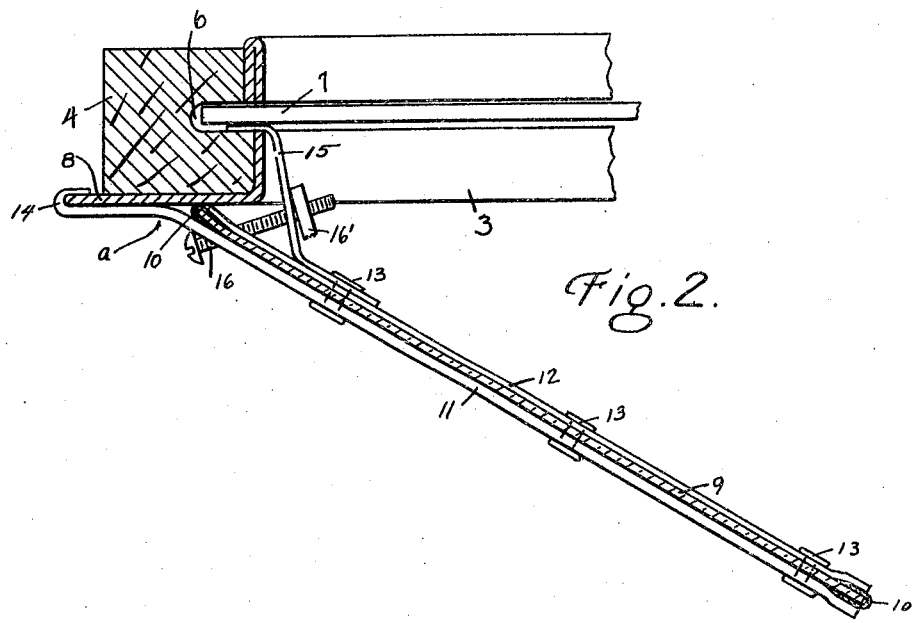
Figure 1:
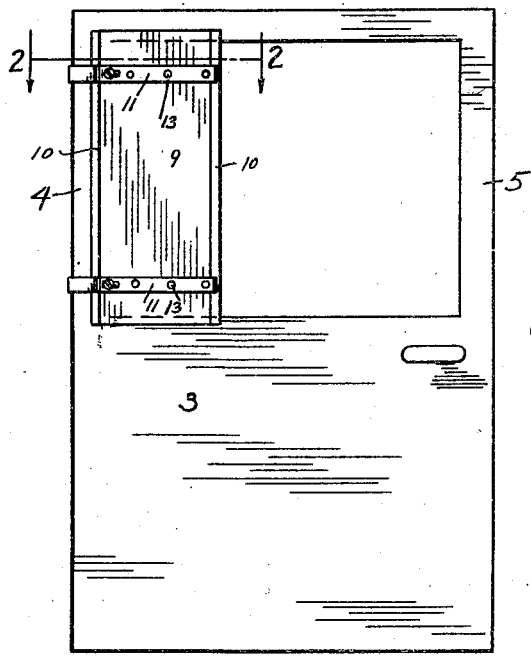

Fig. 1, is a side elevation of an automobile side door with my invention assembled thereon in operative position; and Fig. 2, is a horizontal section on the line 2—2 of Fig. 1, on a larger scale.

Like characters of reference indicate like parts in the two views of the drawing.

The automobile door 3 is of the type commonly used in closed cars and may be a front or rear door, or the only door on a side, when the car is of that design. It has a window opening in its upper portion defined by vertical members 4 and 5, each having a groove 6, on their adjacent sides in which a glass light 7 is slidingly mounted, in the usual manner.

A sheet metal facing 8 covers the outside of the door and projects at the vertical edges to cover the crack between the door and its frame when the door is in closed position. All of the foregoing is of usual and well known construction.

Coming now to my invention, the body 9, of my improved shield is formed of transparent sheet celluloid, the two vertical edges of which are reenforced by sheet metal channel strips 10, 10, that receive the edges in the channels.

Near the top and bottom of the body 9 are the outside metal straps 11, 11, opposite which, on the inside of the body 9, are the metal straps 12, 12, preferably of thinner material, and through the straps 11, 11, body 9 and straps 12, 12, are rivets 13, which hold the assembly. The forward ends of the straps 11, 11, are bent at $a$, at the desired angle to the door at which the shield is to stand, and the extreme ends of the straps are bent to form hooks 14, 14, which hook around the projecting edge of the metal door facing 8.

To hold the shield in the above position, I provide straps 15, 15, preferably of spring steel, which have ends riveted to and upon the straps 12.

The straps 15, 15, are bent inwardly of the door and the ends are continued into close proximity to the window glass where they are both bent to make their extensions parallel with the glass, and are inserted in the adjacent groove 6 of member 4 in the manner clearly shown in Fig. 2.

Threaded bolts 16 pass through each of the straps 15, thence through straps 12, body 9 and outside straps 11. A head on the outer end of each bolt arrests the inward movement of the bolt, caused by tightening up a nut 16' thereon, and this tightening of the nut forces the respective spring straps 15, against the adjacent window member 4. The wind shield is thus held in position, but with sufficient resiliency to withstand jars and jolts on rough roads without breaking.

If desired, the top and bottom edges of the celluloid may be bound by the metal channel strips 10, but ordinarily the horizontal straps make that unnecessary.

By thus making the wind shield of reenforced celluloid and removably securing it in position, a durable and efficient automobile accessory, which can be produced in quantities at a very low cost of manufacture, is provided.

I claim:

1. A wind shield for framed motor car doors formed out of sheet celluloid, metal binders for one or more of the edges, a plurality of horizontal straps in pairs between which the sheet is assembled, rivets through the assembly, the outer straps being extended to contact with the door frame and the extensions bent at an angle with the door at which the shield is to stand and formed with end hooks to engage the outside door facing, mating clamp members secured to the inner straps and extending obliquely therefrom and formed to engage the door facing on the inside, and a bolt for each clamp.

2. A wind shield for motor car doors having facings, said shield formed out of sheet celluloid, metal binders for the vertical edges, horizontal straps in pairs between which the sheet is assembled, rivets through the assembly the outer ones of which have their forward portions bent at an angle with the door at which the shield is to stand and the adjacent end formed in a hook to engage the outer door facing, a clamp member riveted at one end to the inside horizontal straps and bent to engage the inner door facings, and bolts through the shield and inner and outer straps to clamp the shield to the door with the inner edge of the shield contacting with the door frame.

3. The combination, with an automobile door having a window and a member at the side of the window with a window recess and a metal facing for the window member having a projecting edge on the outer corner of the member, of a shield, one or more straps attached to the outside of the shield and extending beyond the shield against the metal facing and terminating with a hook to engage the projecting edge of the facing, said strap extension being bent at an angle at which the shield is to stand to the door, other straps attached to the shield and engaging in the recess of the window member, and screw means to draw the straps together and clamp the shield to the door.

4. The combination of an automobile door having a window and a member at the side of the window with a recess, a metal facing for the member at the side of the window having a projecting edge on the outer corner of the member, a shield formed of celluloid, metal binders for the vertical edges, straps attached to the outside of the shield extending beyond the shield into contact with the metal facing and terminating with a hook engaging the projecting edge of the facing, straps attached to the inside of the shield and engaging the recess of the window member and screw means drawing the inside and outside straps toward each other to clamp the shield to the door with one of the metal binders in contact with the metal facing of the door.

In testimony whereof I affix my signature.

CARL E. SANDSTROM.